No. 734,898.　　　　　　　　　　　　PATENTED JULY 28, 1903.
V. LAPP.
APPARATUS FOR TRANSPORTING FILTERING PLATES, &c.
APPLICATION FILED JUNE 14, 1901.
NO MODEL.　　　　　　　　　　　　　　　　　　3 SHEETS—SHEET 1.

Witnesses:　　　　　　　　　　　　　　　　　Inventor:
Jules C. Hertzog　　　　　　　　　　　　　　Valentin Lapp
E. Hannuck　　　　　　　　　　　　　　　　by B. Singer
　　　　　　　　　　　　　　　　　　　　　　　　atty.

No. 734,898. PATENTED JULY 28, 1903.
V. LAPP.
APPARATUS FOR TRANSPORTING FILTERING PLATES, &c.
APPLICATION FILED JUNE 14, 1901.
NO MODEL. 3 SHEETS—SHEET 2.
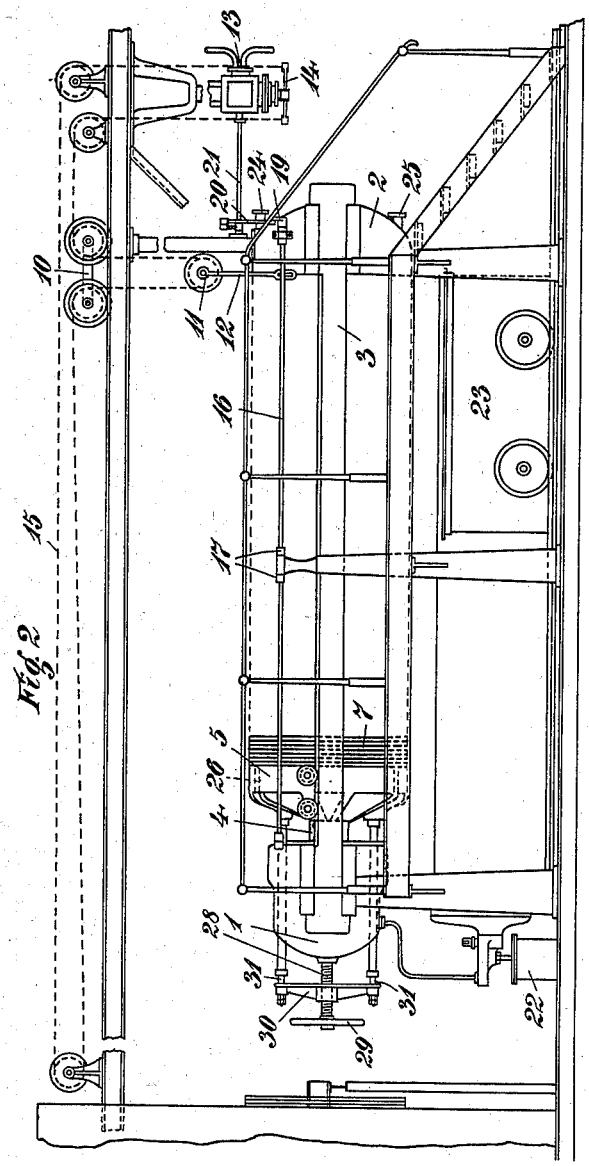
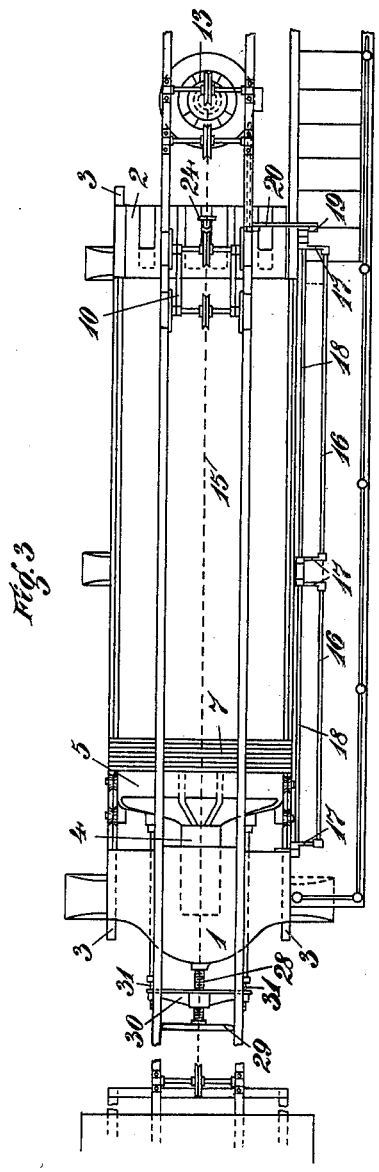
Witnesses:
Jules C. Hertzog
C. Hannach
Inventor:
Valentin Lapp
by B. Singer
atty No. 734,898. PATENTED JULY 28, 1903.
V. LAPP.
APPARATUS FOR TRANSPORTING FILTERING PLATES, &c.
APPLICATION FILED JUNE 14, 1901.
NO MODEL. 3 SHEETS—SHEET 3.

Witnesses:
Jules C. Hertzog
E. Hannach

Inventor:
Valentin Lapp
by B. Singer
atty

No. 734,898. Patented July 28, 1903.

UNITED STATES PATENT OFFICE.

VALENTIN LAPP, OF LINDENAU, NEAR LEIPZIG, GERMANY.

APPARATUS FOR TRANSPORTING FILTERING-PLATES, &c.

SPECIFICATION forming part of Letters Patent No. 734,898, dated July 28, 1903.

Application filed June 14, 1901. Serial No. 64,606. (No model.)

*To all whom it may concern:*

Be it known that I, VALENTIN LAPP, brewer, a subject of the King of Saxony, residing at Lindenau, near Leipzig, in the Kingdom of Saxony, in the German Empire, (whose post-office address is Kaiser Wilhelm Strasse, 3 and 4, Lindenau bei Leipzig, Germany,) have invented a new and useful Apparatus for Transporting Filtering-Plates, &c., of which the following is a specification.

My invention relates to improvements in an apparatus for transporting filtering-plates, &c., which apparatus is also applicable for other uses.

In order to make my invention more clear, I refer to the accompanying drawings, in which similar numerals denote similar parts throughout the several views, and in which—

Figure 1:
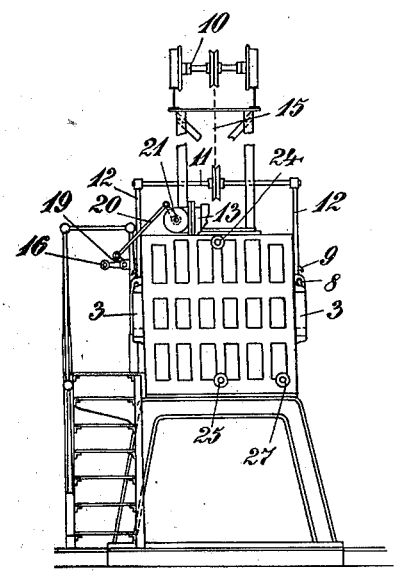
Figure 4:
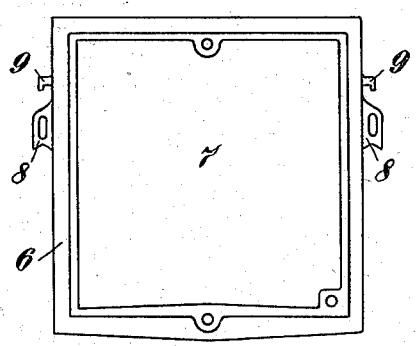
Figure 5:
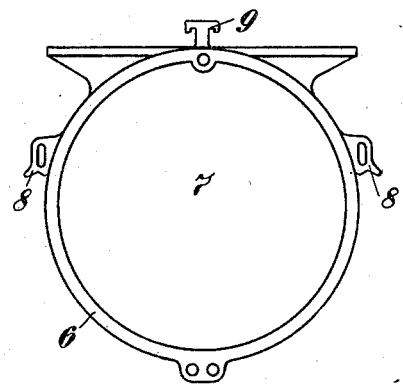
Figure 6:
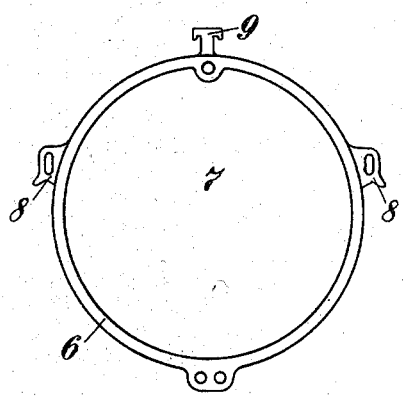
Figure 7:
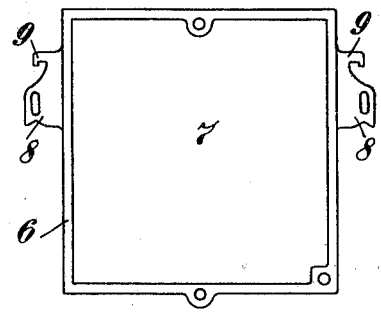

Figure 1 is an end view of the apparatus. Fig. 2 is a side view of the same, and Fig. 3 is a plan. Figs. 4, 5, 6, and 7 are some details which will duly be described hereinafter.

In the form of construction shown as an example in the figures the apparatus is composed, first, of the two head-pieces 1 and 2, which are connected by rods 3, and of which the head-piece 1 is formed into a hydraulic cylinder with a piston 4 and pressing-plate 5, whereas the head-piece 2 serves for leading in and out the wort to be filtered. Between the two head-pieces are located filtering elements consisting of frames 6 and filtering-plates 7 secured thereto. The frames and plates aforementioned are of suitable shape and configuration, and each have projections 8 resting upon the rods 3, and they are provided with hooks 9, by aid of which they may be lifted out of or lowered down into the press.

The lifting device proper consists of a truck 10, adapted to be moved to and fro over the whole length of the apparatus and having a block and tackle, the pulley 11 of which has hook-rods 12 for coupling with the hooks 9 of the frames and plates. In the example shown the lifting device is operated hydraulically, the rope moving the block and tackle being connected with a hydraulic cylinder, the piston of which carries a cross-head 14, to which are attached the two ends of the rope. As soon as the piston is actuated the ends of the rope are put under tension and the block and tackle are raised, irrespective of where the truck stands. When the piston gets back into the cylinder, the rope is moved back to its former position, and the block and tackle are consequently lowered. To operate the cross-head 14, the water is led into the cylinder through suitable pipes, as at 13, the direction of movement of the cross-head being controlled by suitable means having an operative connection with a hand-bar 16, extending along the apparatus, which is secured to levers 17, fixed to an axle 18, and this has attached to it a lever 19, which actuates the shaft 21 by means of a rod 20 and a lever, the shaft 21 controlling the entrance of the water to the cylinder.

The hydraulic pressing device 1 4 5 is operated by a pump 22, and the actuation of the press-plate 5 is effected by means of a threaded spindle 28, having a hand-wheel 29, a threaded cross-head 30, and two rods 31, connecting the latter with the press-plate. The heavy press-plate 5 is supported by four small wheels running upon the rods 3, and the height of the whole device is such that a car 23, adapted to receive the residue, may be shoved under it.

After all the filtering elements are brought in place and tightly connected with each other by the hydraulic cylinder the wort is led into the apparatus by a pipe 24 and pressed through the filtering-cloths by means of a special pump or the like, the passage therethrough being arranged in such manner that the wort may then be led away through a pipe 25, the inlet and outlet pipes 24 and 25 being arranged relative to the press to permit of this result being accomplished. To prevent the apparatus from a noxious surpressure, the pipe 25 has a safety-valve connected by a pipe with the reservoir of the wort. In order to empty the filtering elements, the connection of the latter with each other is broken by letting off the pressure-water, and the press-plate 5 is moved backward for such a distance that sufficient space is obtained to disconnect the frames and plates from each other and to move them backward. In consequence of the frames and the plates being rather heavy they must somewhat be raised for the above-mentioned purpose. This is effected by means of the hydraulic block and tackle after the hook of the rods 12 are brought below the projections 9 of the frames and plates. Thereupon the pressure-water is caused to act by operating the levers 17, and the frames and plates are thus so far lifted that they may be moved along over the apparatus, so as to be removed from the same. When the said parts shall be lifted, the levers 17 are left in their working position only until the frames or plates are raised to the desired distance, where they may be removed by means of the truck 10, after which the lever is brought into the other position in which the pressure-water may escape.

To lixiviate the residues of the filtering material, the head-piece 2 is connected with a pipe 27, through which water may be conducted to the filtering elements. This water escapes through the same pipe through which the clarified wort is let off.

Having now described my invention, what I desire to secure by Letters Patent of the United States is—

1. In a hydraulic filtering-press, having a truck adapted to be freely moved along over the filtering elements, and a block and tackle suspended from said truck and adapted to lift any one of said elements, the combination with said truck, and block and tackle, of a rope or chain extending to and fro along the path of said truck, and having one length carried by and suspended from the latter and having the block and tackle carried by and suspended from the respective part of said length; a rope or chain pulley located at one end of the path of the truck and having the said rope or chain pass around it; a hydraulic cylinder and piston located at the other end of the said path and having both ends of the rope or chain fixed to one of its two parts, and relatively stationary means for operating said hydraulic cylinder and piston from any place along the length of the press, substantially as described.

2. In a hydraulic filtering-press, having a truck adapted to be moved along over the filtering elements, and a block and tackle suspended from said truck and adapted to lift any one of said elements, the combination with said truck, and block and tackle, of a rope or chain extending to and fro along the path of said truck, and having one length carried by and suspended from the latter and having the block and tackle carried by and suspended from the respective part of said length; a rope or chain pulley located at one end of the path of the truck and having the said rope or chain pass around it; a hydraulic cylinder and piston located at the other end of the said path and having the ends of the rope or chain fixed to one of its two parts; a horizontal bar extending along the length of the press; levers holding said bar so as to allow of a vertical movement of the same, and means connecting one of said levers with the water-distributing device of said hydraulic cylinder and piston, substantially as described.

3. In a hydraulic filtering-press, having a truck adapted to be moved along over the filtering elements, and a block and tackle suspended from said truck and adapted to lift any one of said elements, the combination with said truck and block and tackle, of a rope or chain extending to and fro along the path of said truck, and having one length carried by and suspended from the latter and having the block and tackle carried by and suspended from the respective part of said length; a rope or chain pulley located at one end of the path of the truck and having the said rope or chain pass around it; a hydraulic cylinder and piston located at the other end of the said path and having the ends of the rope or chain fixed to one of its two parts, and means for operating said hydraulic cylinder and piston from any place along the length of the press; the position of height of the truck being such as to allow of the said elements being moved along over the other ones, and the length of the truck, and of the rope or chain, to the rear being such as to allow of all the elements being received in the space below the respective surplus of said length with regard to the press, substantially as described.

In witness whereof I have hereunto set my hand in presence of two witnesses.

VALENTIN LAPP.

Witnesses:
RUDOLPH FRICKE,
CHAS. J. BURT.